United States Patent
Shymko

(10) Patent No.: US 6,573,462 B1
(45) Date of Patent: Jun. 3, 2003

(54) SCOOP WITH WEIGH SCALE

(76) Inventor: Wayne W. Shymko, 34 Dvoras Cove, Winnipeg, Manitoba (CA), R2V 4M6

( * ) Notice: Subject to any disclaimer, the term of this patent is extended or adjusted under 35 U.S.C. 154(b) by 53 days.

(21) Appl. No.: 09/790,667

(22) Filed: Feb. 23, 2001

Related U.S. Application Data

(63) Continuation-in-part of application No. 09/365,743, filed on Aug. 3, 1999, now Pat. No. 6,236,001.

(51) Int. Cl.$^7$ .............................................. G01G 19/56
(52) U.S. Cl. ...................... 177/149; 177/211; 177/245; 177/DIG. 9
(58) Field of Search ................. 177/148, 149, 177/245, 25.13, 211, DIG. 9

(56) References Cited

U.S. PATENT DOCUMENTS

| | | | | |
|---|---|---|---|---|
| 412,049 A | * | 10/1889 | Side .......................... | 177/148 |
| 537,743 A | * | 4/1895 | Bergquist .................... | 177/148 |
| 570,434 A | * | 10/1896 | Johnson ...................... | 177/148 |
| 578,642 A | * | 3/1897 | Joslyn ........................ | 177/148 |
| 734,653 A | * | 7/1903 | Alexander .................. | 177/148 |
| 748,856 A | * | 1/1904 | Fox ............................. | 177/148 |
| 781,920 A | * | 2/1905 | Taylor ........................ | 177/148 |
| 784,641 A | * | 3/1905 | Taylor ........................ | 177/148 |
| 807,334 A | * | 12/1905 | Swank ...................... | 177/148 |
| 852,183 A | * | 4/1907 | Howe ......................... | 177/148 |
| 1,266,881 A | * | 5/1918 | Taylor ........................ | 177/148 |
| 2,333,385 A | * | 11/1943 | Le Bert ...................... | 177/148 |
| 5,600,104 A | * | 2/1997 | McCauley et al. .......... | 177/136 |
| 5,646,376 A | * | 7/1997 | Kroll et al. ................. | 177/211 |
| 5,859,390 A | * | 1/1999 | Stafford et al. ............. | 177/144 |
| 6,236,001 B1 | * | 5/2001 | Shymko ..................... | 177/149 |

FOREIGN PATENT DOCUMENTS

| | | | | |
|---|---|---|---|---|
| EP | 0034571 A | * | 8/1981 | ................. 177/148 |
| JP | 61-283836 A | * | 12/1986 | ................. 177/145 |
| JP | 03-96822 A | * | 4/1991 | ................. 177/163 |

* cited by examiner

*Primary Examiner*—Randy Gibson

(57) ABSTRACT

A scoop has a handle attached thereto by a neck, and a load receiving vessel. The neck has a built in load cell and strain gauge supporting the load receiving vessel, which measures weight in the scoop. An analog-digital converter converts the strain gauge output to a digital signal, which displays the weight as a readout Control switches built into the handle or panel control the functions of the scoop, while indicator/annunciator lights indicate status. Either an inclinometer is provided to correct the weight for tilting, or a visible ball bearing switch is provided to cut off the display at a predetermined angle of tilt. Shock loading protection is provided by a flexmount for the load cell, which gives when a predetermined load is applied, which also provides overload protection. Overload protection is also provided by a check rod or load stop built into the load cell.

20 Claims, 4 Drawing Sheets

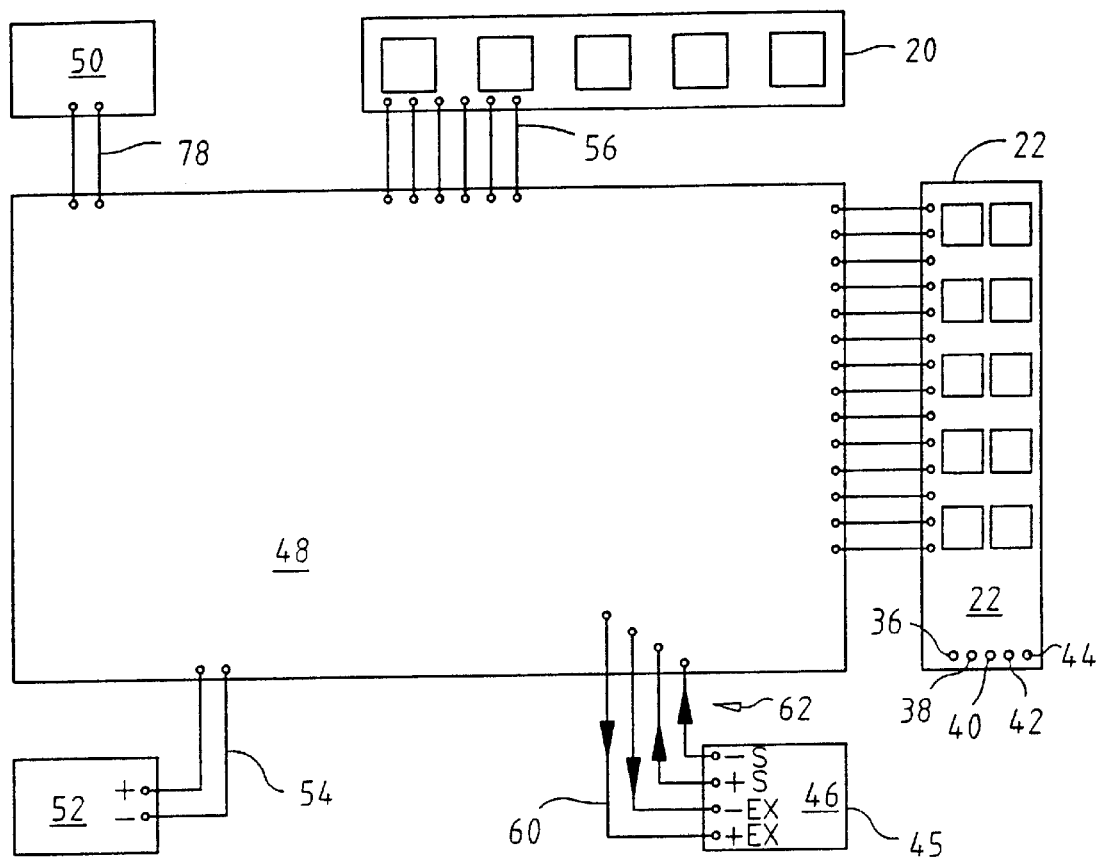
FIG. 4
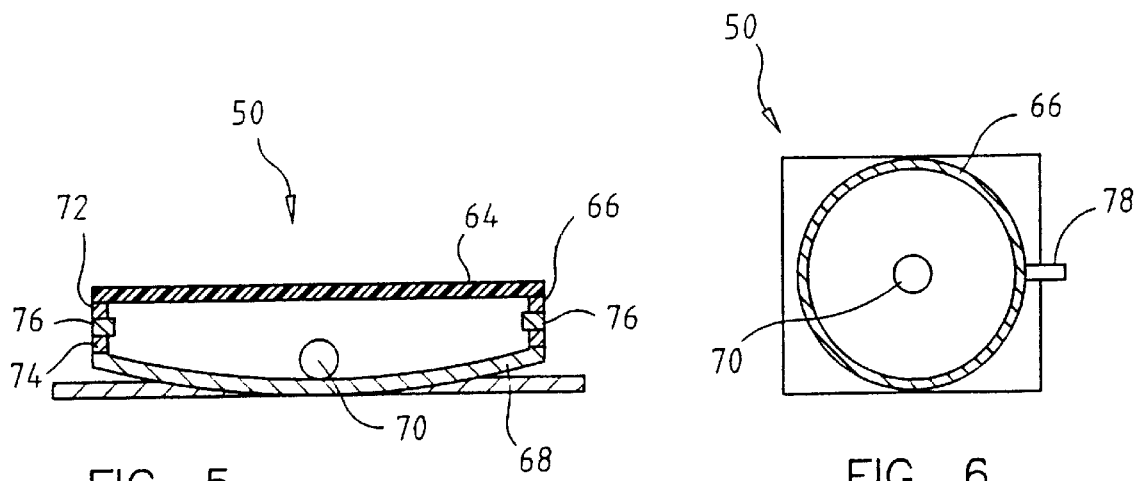
FIG. 5
FIG. 6

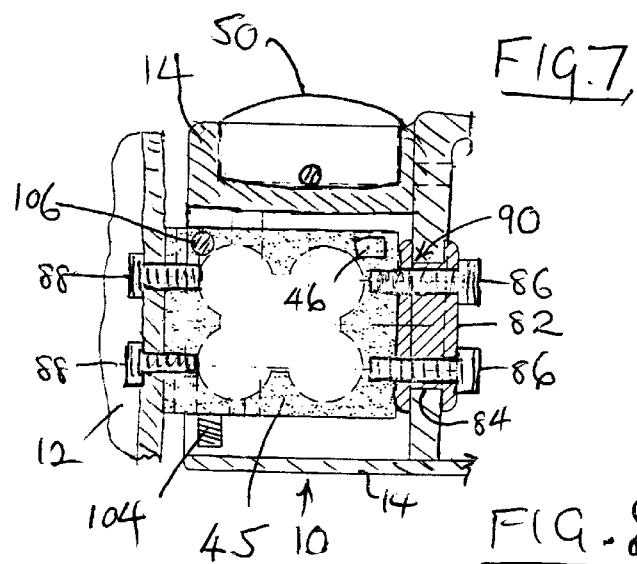
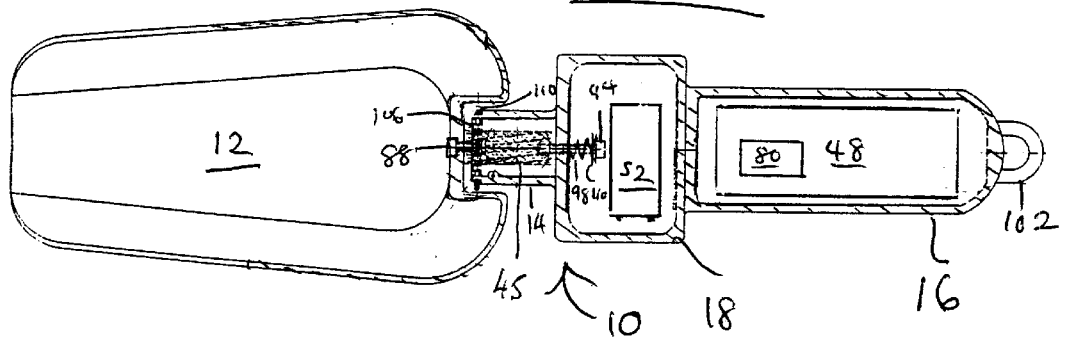
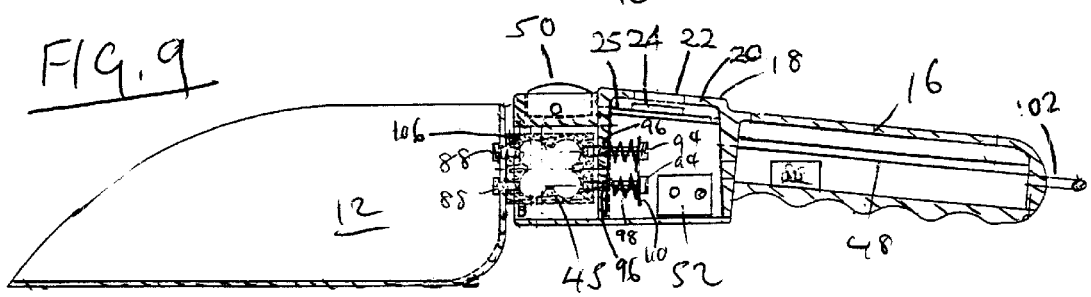

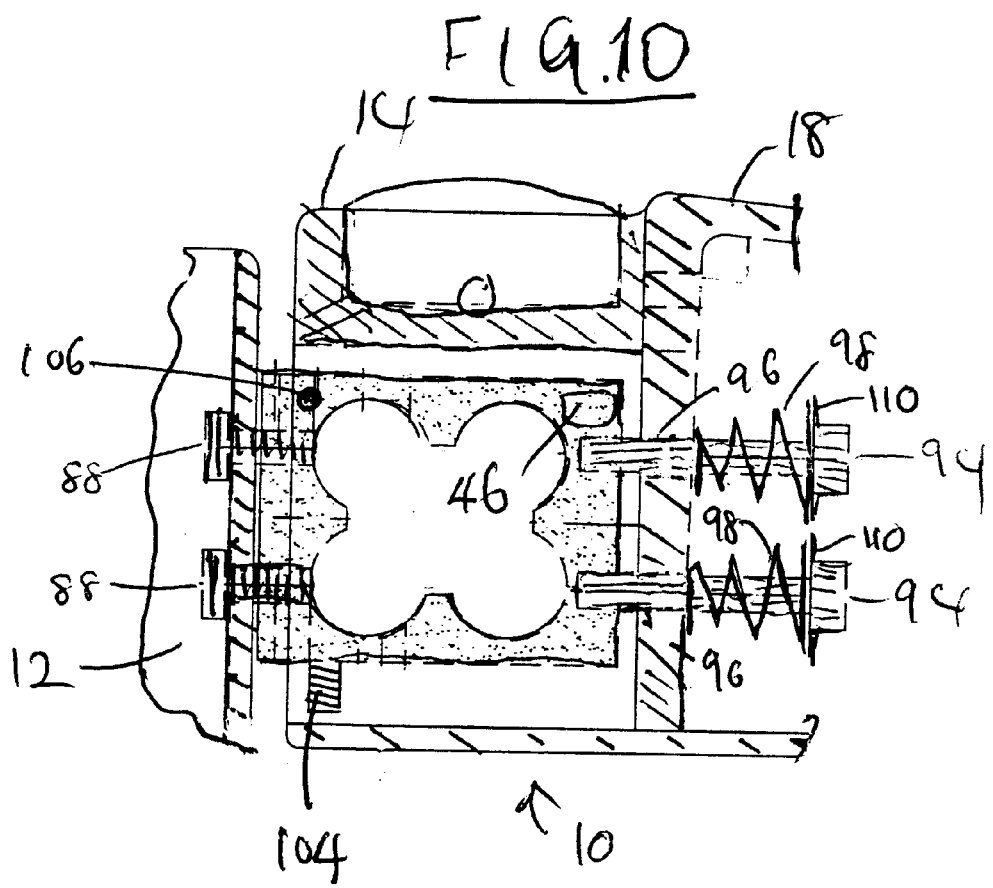
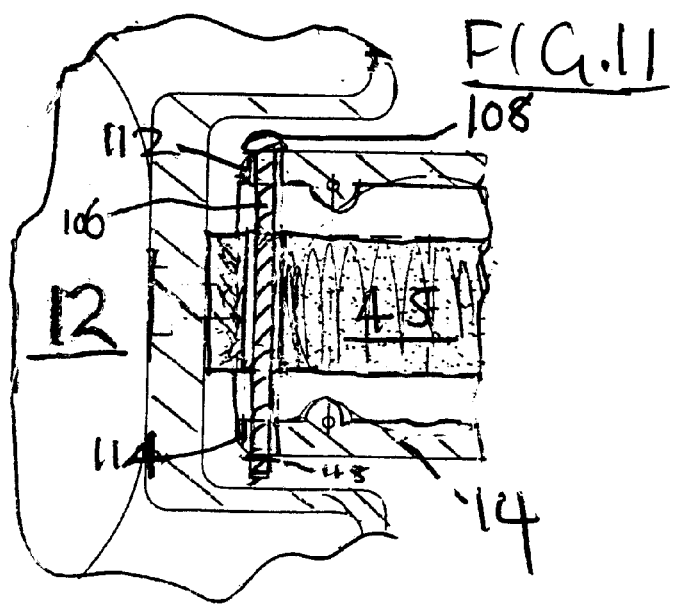

SCOOP WITH WEIGH SCALE

This application is a continuation-in-part of application Ser. No. 09/365,743 filed Aug. 3, 1999, now U.S. Pat. No. 6,236,001, which is hereby incorporated by reference.

The earlier invention relates to scoops with weighing capacity. Scoops generally have load receiving vessels with attached handles. In this case, a weighing device such as a load cell incorporating a strain gauge connects the handle to the load receiving vessel and a display scale is built into the handle. The weighing device is calibrated so that when the load receiving vessel is empty it registers zero, and registers the specific weight of material in the load receiving vessel. This was intended to weigh amounts of material in the kilogram range, when buying or measuring material, since most people have no idea what a gram, kilogram, or five or ten kilograms looks like. In grocery stores, for example it would enable rough estimation of cost of product. It was also considered for "legal for trade" purposes, which would require testing and approval by regulating authority.

For industrial use shock loading and overloading had to be considered, and for "legal for trade" purposes the load registered had to remain constant. Overload protection to prevent damage to the load cell is preferably incorporated. Flexmount protection, which provides relative rigidity at the fixed end of the load cell until the load exceeds a predetermined amount, and yields at that point, was also preferably incorporated, preventing distortion of the load cell. An inclinometer is also preferably incorporated to make the registered load constant.

Although the invention is described and referred to specifically as it relates to specific devices, structures and methods for scoops with handles incorporating display scales, overload protection, flexmount protection and inclinometers, it will be understood that the principles of this invention are equally applicable to similar devices, structures and methods for material containing and handling and accordingly, it will be understood that the invention is not limited to such devices, structures and methods for material containing and handling.

BACKGROUND OF INVENTION

Generally scoops are used to transfer bulk material from a storage or holding container to a traditional weighing scale, where the bulk material is poured out to be weighed. Often a specific approximate or exact amount is required, and achieved by hit and miss methods. It is of practical advantage and convenience to know the amount in the load receiving vessel before pouring. It is also of practical advantage to have overload protection, and flexmount protection, preventing damage to the weighing device, and an inclinometer to provide a constant registered load.

PRIOR ART

Prior art made of record in application Ser. No. 09/365, 743 and hereby incorporated by reference, includes U.S. Pat. No. 412,049, Oct. 1, 1999, to Side; U.S. Pat. No. 537,743, Apr. 16, 1895, to Berquist; U.S. Pat. No. 570,434, Oct. 27, 1896, to Johnson; U.S. Pat. No. 578,642, Mar. 9, 1897, to Joslyn; U.S. Pat. No. 734,653, Jul. 28, 1903, to Alexander; U.S. Pat. No. 781,920, Feb. 7, 1905, to Taylor, U.S. Pat. No. 784,641, Mar. 14, 1905, to Taylor; U.S. Pat. No. 807,334, Dec. 12, 1905, to Swank; U.S. Pat. No. 852,183, Apr. 30, 1907, to Howe; U.S. Pat. No. 1,266,881, May 21, 1918, to Taylor; U.S. Pat. No. 2,333,385, Nov. 2, 1943, to Le Bert; U.S. Pat. No. 2,893,134, Jul. 7, 1959, to Shea et al.; U.S. Pat. No. 3,701,093, Oct. 24, 1972, to Pick; U.S. Pat. No. 4,347, 905, Sep. 7, 1982, to Berckes; U.S. Pat. No. 4,373,155, Feb. 8, 1983, to Dola; U.S. Pat. No. 4,421,186, Dec. 20, 1983, to Bradley; U.S. Pat. No. 4,660,666, Apr. 28, 1987, to Reder et al.; U.S. Pat. No. 4,697,655, Oct. 6, 1987 to Junkas; U.S. Pat. No. 4,832,092, May 23, 1989, to Hirose et al.; U.S. Pat. No. 4,909,340, Mar. 20, 1990, to Kazais et al.; U.S. Pat. No. 5,042,158, Aug. 27, 1991, to Schmelzer; U.S. Pat. No. 5,121,328, Jun. 9, 1992, to Sakai et al.; U.S. Pat. No. 5,199,518, Apr. 6, 1993, to Woodle; U.S. Pat. No. 5,442,146, Aug. 15, 1995, to Bell et al.; U.S. Pat. No. 5,545,855, Aug. 13, 1996, to Stanfield et al.; U.S. Pat. No. 5,646,376, Jul. 8, 1997, to Kroll et al.; U.S. Pat. No. 5,669,147, Sep. 23, 1997, to Nakajima et al.; U.S. Pat. No. 5,714,695, Feb. 3, 1998, to Bruns; U.S. Pat. No. 5,773,767, Jun. 30, 1998, to Collins, Jr. et al.; U.S. Pat. No. 5,854,447, Dec. 29, 1998, to Greenwood et al.; U.S. Pat. No. 5,995,713, Sep. 21, 1999, Titus et al.

It is a principal object of the invention to provide shock loading protection for a scoop having a weigh scale operatively associated with a load cell. It is another principal object to provide overload protection for a scoop having a weigh scale operatively associated with a load cell. It is a another principal object of the invention to provide an inclinometer for a scoop having a weigh scale operatively associated with a load cell, to correct weigh scale readings for angular deviation from the horizontal, in two, four or six (multi-dimensional) directions. It is a further principal object of the invention to provide a visible ball bearing switch, which cuts off the weigh scale display, at a predetermined angle of tilt. It is a subsidiary object of the invention to provide a flexmount of predetermined yield load at the fixed end of the load cell, to provided shock loading and overload protection. It is a further subsidiary object of the invention to provide a flexmount formed by an elastomeric grommet of predetermined yield load to hold retaining bolts for the load cell. It is a further subsidiary object of the invention to provide a flexmount formed by spring mounted retaining bolts of predetermined yield load for the load cell. It is a further subsidiary object of the invention to provide overload protection at the moving end of the load cell. Further subsidiary objects of the invention are to provide a check rod and/or an overload stop at the moving end of the load cell for overload protection. It is a further subsidiary object of the invention to provide a load cell that is moment insensitive binocular single point shear beam. It is a further subsidiary object of the the invention to provide a metal security ring in the handle of the scoop. Other objects will be apparent to those skilled in the art from the following specification, appended claims and accompanying drawings.

DESCRIPTION OF THE INVENTION

In one broad aspect the invention is directed to a scoop having a load receiving vessel and a handle attached to the vessel. Load cell means with strain gauge means, is mounted in the handle and bearing the load receiving vessel. The strain gauge means is operatively associated with CPU means, which are operatively associated with readout display means, whereby a weight in the load receiving vessel is converted to a display number on the readout display means. Inclinometer means are mounted in the handle and operatively associated with the CPU, whereby angular deviation from the horizontal is compensated so that the readout display means shows the correct weight. The inclinometer means may be two dimensional, which compensates for angular deviation in two opposed directions from the horizontal along the load receiving vessel-handle axis. It may be four-dimensional, which compensates for angular deviation from the horizontal along the load receiving vessel-handle axis and at right angles thereto. It may be multi-dimensional, which compensates for angular deviation from the horizontal in any direction. Two-dimensional inclinometers were found effective, use of the more sensitive forms would improve accuracy, but not to a significant practical degree. The more sensitive inclinometers are generally more expensive, and this increases with the angular compensation covered, which in theory can approach 45° from the horizontal. Preferably the handle has a metal security ring at the end furthest from the load receiving vessel. In use this is typically attached to a chain itself attached to a wall or floor eye bolt or the like to prevent the scoop being stolen.

In another broad aspect the invention is directed to a scoop having a load receiving vessel and a handle attached to the vessel, and load cell means with strain gauge mean. The handle has a neck. The load cell means is mounted in flexmount means of predetermined yield load in the neck and bears the load receiving vessel. The load cell means has associated overload protection means. The strain gauge means is operatively associated with CPU means, which are operatively associated with readout display means, whereby a weight in the load receiving vessel is converted to a display number on the readout display means. Preferably the neck has opposed top and bottom walls and opposed side walls and an end handle wall opposite the load receiving vessel. Preferably the fixed end of the load cell means is attached to flexmount means mounted in the end wall and the load receiving vessel is mounted on the moving end of the load cell means. The flexmount means may comprise paired horizontal vertically aligned bolts passing through the end wall and engaging threaded apertures in the load cell means. Each bolt has a washer urged away from the end wall by a spring, the washer presses against the head of the bolt. The flexmount has a predetermined yield load, which is achieved by varying the compressive strength of the springs. The yield load can be reproducibly predetermined by routine experimentation, varying the springs until the desired yield load is achieved. Alternatively the flexmount means comprises an elastomeric grommet of predetermined yield load mounted matingly in an aperture in the end wall. The grommet has opposed generally planar faces and paired spaced apart peripheral flanges to engage the end wall around the aperture. The grommet also has paired horizontal vertically aligned apertures, with paired horizontally aligned bolts passing through these grommet apertures and engaging threaded apertures within the load cell means. The heads of the bolts press against one of the planar faces. The grommets are made from elastomers, often mixed. They are made by compounding suitable elastomers and vulcanizing them as known to those skilled in the rubber compounding art. Generally a suitable mixture is compounded and moulded under suitable vulcanizing conditions in a single step. It is then tested for yield load, it was found that the same mixture moulded and vulcanized under identical conditions produced reproducible yield loads, both from sample to sample, and with reiteration. The number of suitable possible vulcanizable elastomers and mixtures is vast. Shore A Durometer Hardness was found a reliable rough indicator of yield load for selection of vulcanizable mixtures. The overload protection means preferably comprises a transverse check rod passing horizontally through the load cell means. The ends of the check rod are secured in opposed apertures in the neck side walls. Generally the check rod is a bolt, whose head engages an outer surface of a neck side wall, while the other end engages an outer surface of the other neck side wall. Alternatively the overload protection means comprises a load stop, which is a projecting threaded rod received within a threaded aperture in the bottom of the load cell means, which on overload engages the bottom wall of the neck. In combination once the load passes the predetermined yield load, the flexmount ceases to support the load cell, which then moves downward until stopped by check rod or load stop. Desirably Inclinometer means are mounted in the handle and operatively associated with the CPU, whereby angular deviation from the horizontal is compensated so that the readout display means shows the correct weight. The inclinometer means may be two dimensional, which compensates for angular deviation in two opposed directions from the horizontal along the load receiving vessel-handle axis. It may be four-dimensional, which compensates for angular deviation from the horizontal along the load receiving vessel-handle axis and at right angles thereto. It may be multi-dimensional, which compensates for angular deviation from the horizontal in any direction. Often the handle has a metal security ring at the end furthest from the load receiving vessel. A level indicator may be mounted on the neck top wall, which comprises a conducting base being part of a electric circuit, and forming a sector of a generally spherical surface. The base has a conducting surface, which is typically metal, conveniently the entire base is a metal plate or sheet. A sidewall circumjacent the sector extends inward toward the center of the spherical surface. The sidewall has a circumferential conducting element spaced apart from and above the conducting base. This conducting element is part of the electric circuit and generally level when the indicator is level. A round conductor typically a ball bearing rests and is rollable on the conducting base. The ball bearing is in the middle of the conducting base when the base is level, and touches the conducting element in the sidewall when resting against the sidewall, whereby the electric circuit is closed. The electric circuit when open may allow an indicator/annunciator light to light and when closed switches it off. The spherical surface preferably subtends an angle of between about 8 and 12° at the center of the spherical surface, allowing the ball bearing to displace up to half the angle before contacting the sidewall. The level indicator may have a transparent insulating top wall above and touching the sidewall spaced apart from and opposed to the conducting base.

In a third broad aspect the invention is directed to a scoop having a load receiving vessel and a handle attached to the vessel, and moment insensitive binocular single point shear beam load cell means with strain gauge means. The load cell means is mounted in the handle and bears the load bearing vessel. The strain gauge means is operatively associated with CPU means, which is operatively associated with readout display means, whereby a weight in the load bearing vessel is converted to a display number on the readout display means. The handle has a neck comprising opposed top and bottom walls and opposed side walls and an end handle wall opposite the load bearing vessel. The fixed end of the load cell means is attached to flexmount means mounted in the end wall. The load receiving vessel is mounted on the moving end of the load cell means, which has associated overload means. A ball bearing level indicator as described above may be mounted on the exterior top wall of the neck. The flexmount may comprise an elastomeric grommet of predetermined yield load as described above. The overload protection means may comprise a transverse check rod as described above. Inclinometer means may be mounted in the handle and operatively associated with the CPU, whereby angular deviation from the horizontal can be compensated so that the readout display means shows the correct weight. The flexmount may comprise an elastomeric grommet of predetermined yield load as described above, while the overload protection means may comprise a transverse check rod as described above. Usually the handle has a metal security ring at the end furthest from the load bearing vessel.

Typically there is a control switch assembly operatively associated with the CPU means, and similarly there are indicator/annunciator lights operatively associated with the CPU means. The control switch assembly has a plurality of switches, typically one switch each for ON/ZERO, OFF, ACCUMULATE, HOLD and UNITS. The ON/ZERO switch actuates the CPU means on first actuation, and setting the display number to zero on second and subsequent actuations. The OFF switch deactivates the CPU means. The ACCUMULATE switch actuates the readout display when a second or subsequent weight is placed in the load bearing vessel displaying the summed weights as a display number on the readout display. The HOLD switch actuates the readout display to display the previous display number. The UNITS switch changes the units of weight of the display number, from metric to avoirdupois, or from avoirdupois to metric. Typically the indicator/annunciator lights comprise ZERO, HOLD, and UNITS lights. The ZERO light is lit when the display number on the readout display is zero, but not otherwise. The HOLD light is lit when the readout display shows the previous display number, but not otherwise. One UNIT light is lit when the display number indicates metric units, but not otherwise. The other UNIT light is lit when the display number indicates avoirdupois units, but not otherwise. The switches may be tactile in a membrane keyboard as part of the display or separate, while the lights similarly may be part of the display, or separate. Either a level indicator or an inclinometer is preferably operatively associated with the CPU means. The level indicator actuates a level registering means, which registers level when the means is horizontal or at an angle to the horizontal less than or equal to a predetermined angle, and does not register level when the means is at an angle to the horizontal greater than the predetermined angle. An indicator/annunciator light may be operatively associated with the level registering means. The light is lit when the level registering means registers level, and off otherwise.

BRIEF DESCRIPTION OF THE DRAWINGS

FIG. 4 shows a schematic of an embodiment of the circuitry of the invention.

FIG. 5 shows a side sectional view of a level indicator of the invention.

FIG. 6 shows a top sectional view of a level indicator of the invention.

FIG. 7 shows an enlarged side sectional view of the load cell arrangement of FIG. 3.

FIG. 8 shows a top sectional plan view of an embodiment of the invention.

FIG. 9 shows a side sectional elevational view of the embodiment of FIG. 8.

FIG. 10 shows an enlarged side sectional view of the load cell arrangement of FIG. 8.

FIG. 11 shows a top sectional view of a load cell of of the invention.

DESCRIPTION OF THE PREFERRED EMBODIMENTS

Figure 1:
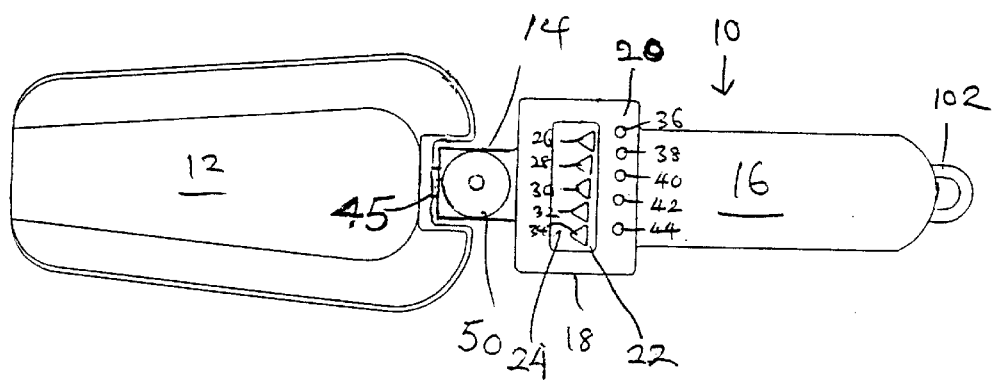
FIG. 1 shows a top exterior plan view of an embodiment of the invention.

The invention is now illustrated by reference to preferred embodiments thereof. Numeral 10 indicates the weigh scoop of the invention. weigh scoop 10 has load receiving vessel 12 connected by load cell 45 incorporating strain gauge 46 to handle 16. Load cell is preferably covered by neck 14, attached to, or more preferably integral with handle 16. Handle 16 has broad end 18 for membrane keyboard 20, which has display panel 22 for display 24. Keyboard 20 has tactile switches which may conveniently be built beside display panel 22 as switches 36 to 44, where switch 36 is UNITS, switch 38 is HOLD, switch 40 is ACCUMULATE, switch 42 is OFF, switch 44 is ON/ZERO. Indicator/annunciator lights 26 to 34 are within display panel 22, where light. 26 indicates LEVEL, light 28 indicates METRIC (Kg/g) units, light 30 indicates AVOIRDUPOIS (or IMPERIAL) (Lb/Oz) light 32 indicates HOLD, light 34 indicates ZERO. The HOLD/ACCUMULATE switches can be combined into a single switch, either switch 38 or switch 40. The indicator/annunciator lights can also be beside display panel 22. Display 24 is beneath display panel 22 mounted on display board 25. Handle 16 has security ring 102, typically metal, embedded in its end. Security ring 102, may be U-shaped, D-shaped or circular with a generally semi-circular portion projecting from handle 16. Strain gauge 46 of load cell 45 measures the weight in load receiving vessel 12 in analog form (stress/strain, deformation/displacement), which is converted by Analog/Digital converter in board 48 in handle 16 to digital signal for the CPU to process to digital readout on display 24. There is also optional level switch indicator 50 mounted preferably on neck 14, when present, and operatively associated with board 48, to ensure the scoop is held level to provide for the most accurate weighments. Alternatively and more preferably inclinometer 80 is provided within handle 16 as shown, or broad end 18, to compensate for angular deviation from the horizontal. Inclinometer 80 may be two-dimensional that is it compensates for the angular deviation of the long axis of the scoop from horizontal. It may be four-dimensional compensating for transverse angular deviation of the scoop as well. It may be multi-dimensional compensating for all angular deviations from the horizontal. In practice a two-dimensional inclinometer was found satisfactory for most purposes.

Figure 2:
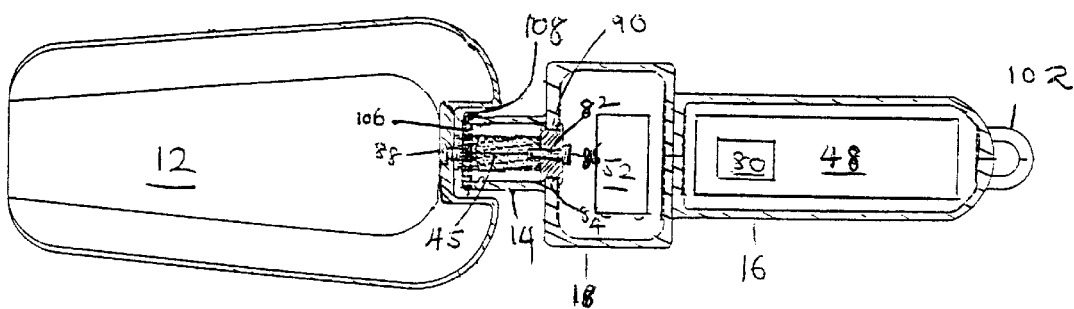
FIG. 2 shows a top sectional plan view of an embodiment of the invention.
Figure 3:
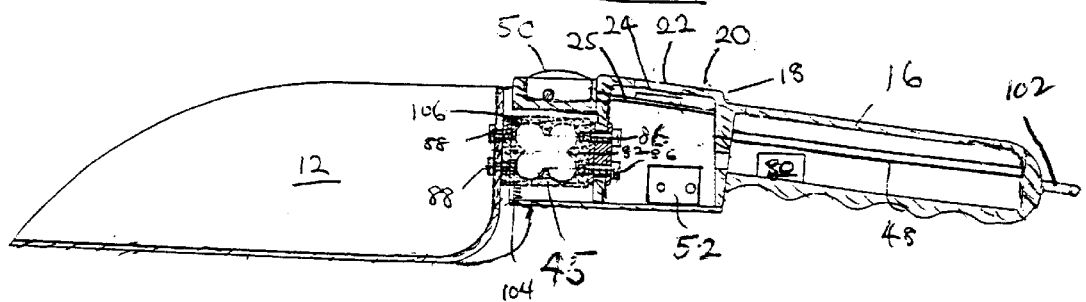
FIG. 3 shows a side sectional elevational view of the embodiment of FIG. 2.

Load cell 45 incorporating strain gauge 46, is a deforming spring as well known to those skilled in the art. In this case several considerations were applied, the device is a shear beam load cell deforming linearly within limits over the desired range. The range is approximately 7000 gms (15 lbs) by 1 gm increments. The most sophisticated current indicators require 0.75 uV/graduation signal, in this case a less sophisticated, but not much less sophisticated, device having a sensitivity of 1.25 uV/graduation signal is necessary to weigh accurately and sensitively. The typical range is 10 mV, giving for the planned maximum of 7000 gms, 1.4 uV/graduation signal, in graduation steps of 1 gm each. Typical load cell maximum outputs are 2 or 3 mV per applied V, in this case although the applied voltage is 9 volts, stabilization lowers this to 5 volts. Computer simulations of loads and load cell responses, eliminated most load cell types. Stress testing was applied to four distinct types of load cells determined that a moment insensitive binocular single point shear beam load cell was appropriate, as recognized by those skilled in the art, the illustrated load cell 45 is that type. Practical size (the device must fit in the hand), weight (it has to be held by normal humans, who are more often female than male), and expense considerations limited rated load cell capacity. While loads should not exceed the rated capacity, some loads should approach the rated load cell capacity. Shock loading and overloading also had to be considered. Flexmounts were included to address shock loading, in FIGS. 2, 3, and 7 elastomeric bushing 82 is shown, which fits into aperture 84 between broad end 18 and neck 14, bolts 86 secure load cell 45 to handle 16 by flexmount 82 at its fixed end, similar bolts 88 secure load receiving vessel 12 to load cell 45 at its moving end. Bushing 82 has peripheral groove 90 to fit aperture 84, and apertures 92 for bolts. The bushing is chosen so that the flexmount and load cell remain rigid until a load of 5000 gms is applied, when the bushing flexes and rests on loadstops. An alternative flexmount shown in FIGS. 8, 9 10, comprises paired bolts 94 passing through apertures 96 to secure load cell 45 to handle 16 at its fixed end. Springs 98 urge washers 100, which may be separate from or integral with bolts 94. Both flexmounts adequately prevent shock loading damage. To prevent overloading damage three possibilities were considered. One, very commonly used in the art, provides a central longitudinal threaded bolt connecting the fixed and moving ends of the load cell, limiting distortion, which didn't work, because the threads become clogged with powder and the like, and load cell reliability suffered as a result. Another provides downward load stop bolt 104 which works by limiting the movement of load cell 45, which did work adequately. A third provides check rod 106, whose ends pass through side apertures 112 and 114 in neck 14. Rod head 108 secures rod 106 in position on one side, the far end snaps into plastic or metal split ring 118. In the embodiment shown light 26 is on when level and off when not. 9V battery 52 in broad end 18, as shown, or handle 16, provides power and excitation voltage to load cell, CPU, and display. Tactile switches, CPU, A/D converter, strain gauge load cell, and battery are all readily available conventional technology. The scoop can be made of any conventional materials that suit customer requirements, such as corrosive environment, or regulatory requirements, such as those imposed by departments of agriculture and health. Load receiving vessel 12 need not be the same material as handle 16 (and neck 14), as load receiving vessel 12 is generally more subject to regulatory requirement than handle 16. Pvc, especially flex pvc is preferred, as is polypropylene, but conventional light metals, conventional plastics and wood, or even conventional ceramics can be used in load receiving vessel and handle. Weighing capacity is envisaged between a minimum capacity of 10 oz (about 300 grams) and a maximum capacity of 160 oz (about 5 kilograms), with graduation steps of 1 to 10 oz, which is felt to be the most convenient range, although lesser and greater capacities, as well as different graduation steps, may be employed as those skilled in the art appreciate. This can be carried out routinely by programming the CPU converter with different parameters. In FIG. 8 is shown a schematic of the circuitry of the preferred embodiment. CPU and A/D converter are part of board 48, which is supplied with power by battery 52 through power lines 54, keyboard 20 is connected by data lines 56 to board 48, as is display panel 22 by data lines 58. Load cell 45 is connected to board 48 by paired excitation lines 60, while paired data lines 62 provide analog output to board 48. Level indicator 50 is shown in FIGS. 9 and 10, with transparent level top 64, circular sidewall 66 and conductive bottom wall 68, which forms a segment of a sphere. Inside level indicator 50 is metal ball bearing 70, as those skilled in the art appreciate any electrically conductive sphere will do. Bottom 68 subtends an angle of 8 to 12° at the center of the sphere of which it is part, to match the optimal maximum out-of-level condition (4 to 6°) so that when ball bearing 70 contacts sidewall 66, scoop 10 is from 4 to 6° from horizontal. Sidewall 66 has upper and lower insulating portions 72 and 74 separated by conductor 76. Conductor 76 is preferably circumferentially continuous and has conducting connector 78 to board 48. When level indicator 50 is tilted so ball bearing 70 contacts conductor 76 it closes a circuit between metal plate 68 and connector 78 supplying current to board 48. When this circuit is closed annunciator/indicator light 26 goes out, and optionally display panel 22 and display 24 is disabled so that there is no weight reading. Otherwise, when the circuit is open annunciator/indicator light 26 is on display panel 22 and display 24 is enabled. The level indicator is mounted atop neck 14, so that the position of ball 70 is visible through transparent top 64, allowing the operator to maneuver the handle to center the ball within the indicator. Conductor 78 may be formed of one or more wires threaded through holes in sidewall 64, which are conveniently of copper. These wire or wires may be twisted around each other or braided to form connector 78. Ball bearing 70 is less in diameter than the height of sidewall 66 to allow free movement.

Any number of materials can be used to manufacture the load receiving vessel. When food or agricultural products are weighed, the load receiving vessel, and perhaps the handle are desirably made of materials approved by both the USDA (United States Department of Agriculture) and the FDA (Food and Drug Administration, of the United States) for use with food and agricultural products. Definitions of acceptable materials are listed at Title 21 Code of Federal Regulation Parts 170–199, with acceptable polymers listed under Part 177. Specific polymers are often designated approved through NSF 51. For the purpose of food contact the load receiving vessel is manufactured from PVC (polyvinylchloride), especially preferred is flex PVC, polypropylene may also be used. PVC and polypropylene are approved by both the USDA (United States Department of Agriculture) and the FDA (Food and Drug Administration, of the United States) for use with food and agricultural products. The load bearing vessel and handle are not restricted to these materials, depending on use and applicable jurisdiction and regulation, conventional light metals including alloys, a wide range of conventional plastics, ceramics, and wood may be used.

In use the ON/ZERO switch is actuated, to activate the device then the ON/ZERO switch is actuated to set the scale at zero. The LEVEL switch or indicator indicates whether the load receiving vessel is level (within 4° to 6° of horizontal) or not, which may be necessary for "legal for trade" applications and to achieve optimal weighing results. The load receiving vessel is then used to pick up material, the weight of which is indicated on the display. By actuating either the UNITS switch, the display will read in grams or ounces. The HOLD switch is used to indicate the previous weight, after the load receiving vessel is emptied, while the ACCUMULATE switch accumulates multiple weighments and provides a grand total of those weighments. HOLD and ACCUMULATE functions are conventional in the scale art. They also may be combined into a HOLD/ACCUMULATE switch, which on first actuation performs as HOLD and on second actuation behaves as ACCUMULATE. The OFF switch is used to switch the device off, an adjustable timer is built into the CPU board 48 to switch the device off after a predetermined time to lengthen battery life.

As those skilled in the art would realize these preferred described details and materials and components can be subjected to substantial variation, modification, change, alteration, and substitution without affecting or modifying the function of the described embodiments.

Although embodiments of the invention have been described above, it is not limited thereto, and it will be apparent to persons skilled in the art that numerous modifications and variations form part of the present invention insofar as they do not depart from the spirit, nature and scope of the claimed and described invention.

I claim:

1. Scoop having a load receiving vessel and a handle attached to said vessel, and load cell means with strain gauge means, said load cell means being mounted in said handle and bearing said load receiving vessel, said strain gauge means being operatively associated with CPU means and said CPU means being operatively associated with readout display means, whereby a weight in said load receiving vessel is converted to a display number on said readout display means, inclinometer means being mounted in said handle and operatively associated with said CPU, whereby angular deviation from the horizontal is compensated so that said readout display means shows the correct weight.

2. Scoop of claim 1, wherein said inclinometer means is two dimensional compensating angular deviation from the horizontal along the load receiving vessel-handle axis.

3. Scoop of claim 1, wherein said inclinometer means is four dimensional compensating angular deviation from the horizontal along the load receiving vessel-handle axis and at right angles thereto.

4. Scoop of claim 1, wherein said inclinometer means is multi-dimensional compensating angular deviation from the horizontal in any direction.

5. Scoop of claim 1 wherein said handle has a metal security ring at the end furthest from said load receiving vessel.

6. Scoop having a load receiving vessel and a handle attached to said vessel, and load cell means with strain gauge means, said handle having a neck, said load cell means being mounted in flexmount means of predetermined yield load, said flexmount means being mounted in said neck, said flexmount means flexing at said predetermined yield load to avoid shock loading damage, said flexmount means being distinct from said load cell means and said neck, said load cell bearing said load receiving vessel, said load cell means having associated overload protection means, said strain gauge means being operatively associated with CPU means and said CPU means being operatively associated with readout display means, whereby a weight in said load receiving vessel is converted to a display number on said readout display means.

7. Scoop of claim 6, wherein said neck has opposed top and bottom walls and opposed side walls and an end handle wall opposite said load receiving vessel, and said fixed end of said load cell means being attached to said flexmount means mounted in said end wall and said load receiving vessel is mounted on said moving end of said load cell means.

8. Scoop of claim 7, wherein said flexmount means comprises paired horizontal vertically aligned bolts passing through said end wall and engaging threaded apertures in said load cell means, each said bolt having a washer urged away from said end wall by a spring, said washer pressing against the head of said bolt, said flexmount having a predetermined yield load.

9. Scoop of claim 7, wherein said flexnount means comprises an elastomeric grommet of predetermined yield load mounted matingly in an aperture in said end wall, said grommet having opposed generally planar faces and having paired spaced apart peripheral flanges to engage said end wall around said aperture, said grommet also having paired horizontal vertically aligned apertures, and paired horizontally aligned bolts passing through said grommet apertures and engaging threaded apertures within said load cell means, the heads of said bolts pressing against one of said planar faces.

10. Scoop of claim 7, wherein said overload protection means comprises a transverse check rod passing horizontally through said load cell means, the ends of said check rod being secured in opposed apertures in said neck side walls.

11. Scoop of claim 7, wherein said overload protection means comprises a load stop, being a projecting threaded rod received within a threaded aperture in the bottom of said load cell means, which on overload engages the bottom wall of said neck.

12. Scoop of claim 6, having inclinometer means mounted in said handle and operatively associated with said CPU, whereby angular deviation from the horizontal is compensated so that said readout display means shows the correct weight.

13. Scoop of claim 12, wherein said inclinometer means is two dimensional compensating angular deviation from the horizontal along the load receiving vessel-handle axis.

14. Scoop of claim 12, wherein said inclinometer means is four dimensional compensating angular deviation from the horizontal along the load receiving vessel-handle axis and at right angles thereto.

15. Scoop of claim 12, wherein said inclinometer means is multi-dimensional compensating angular deviation from the horizontal in any direction.

16. Scoop of claim 12, wherein said handle has a metal security ring at the end furthest from said load receiving vessel.

17. Scoop of claim 6, wherein a level indicator is mounted on the top exterior wall of said neck comprising a conducting base being part of a electric circuit, and forming a sector of a generally spherical surface, a sidewall surrounding said sector extending inward toward the center of said spherical surface, said sidewall having therein a circumferential conducting element spaced apart from and above said conducting base, said conducting element being part of said electric circuit and generally level when said indicator is level, a ball bearing resting and rollable on said conducting base, said ball bearing being in the middle of said conducting base when said base is level, and touching said conducting element in said sidewall when resting against said sidewall, whereby said electric circuit is closed, said circuit being operatively associated with said CPU means, and when closed disabling said readout display means, and where said sector of said spherical surface subtends an angle of between about 8 and 12° at the center of said spherical surface, so that said ball bearing can displace up to half said angle before contacting said sidewall, and said level indicator has a transparent insulating top wall above and touching said sidewall spaced apart from and opposed to said conducting base.

18. Scoop having a load receiving vessel and a handle attached to said vessel, and moment insensitive binocular single point shear beam load cell means with strain gauge means, said load cell means being mounted in said handle and bearing said load bearing vessel, said strain gauge means being operatively associated with CPU means and said CPU means being operatively associated with readout display means, whereby a weight in said load bearing vessel is converted to a display number on said readout display means, said handle having a neck comprising opposed top and bottom walls and opposed side walls and an end handle wall opposite said load bearing vessel, and the fixed end of said load cell means being attached to flexmount means of predetermined yield load mounted in said end wall of said neck, said flexmount means flexing at said predetermined yield load to avoid shock loading damage, said flexnount means being distinct from said load cell means and said neck and said load receiving vessel is mounted on said moving end of said load cell means, said load cell means having associated overload protection means.

19. Scoop of claim 18, wherein a level indicator is mounted on the top exterior wall of said neck comprising a conducting base being part of a electric circuit, and forming a sector of a generally spherical surface, a sidewall surrounding said sector extending inward toward the center of said spherical surface, said sidewall having therein a circumferential conducting element spaced apart from and above said conducting base, said conducting element being part of said electric circuit and generally level when said indicator is level, a ball bearing resting and rollable on said conducting base, said ball bearing being in the middle of said conducting base when said base is level, and touching said conducting element in said sidewall when resting against said sidewall, whereby said electric circuit is closed, said circuit being operatively associated with said CPU means, and when closed disabling said readout display means, and where said sector of said spherical surface subtends an angle of between about 8 and 12° at the center of said spherical surface, so that said ball bearing can displace up to half said angle before contacting said sidewall, and said level indicator has a transparent insulating top wall above and touching said sidewall spaced apart from and opposed to said conducting base and said flexmount means comprises an elastomeric grommet of predetermined yield load mounted matingly in an aperture in said end wall, said grommet having opposed generally planar faces and having paired spaced apart peripheral flanges to engage said end wall around said aperture, said grommet also having paired horizontal vertically aligned apertures, and paired horizontally aligned bolts passing through said grommet apertures and engaging threaded apertures within said load cell means, the heads of said bolts touching one of said planar faces, and said overload protection means comprises a transverse check rod passing horizontally through said load cell means, the ends of said check rod being secured in opposed apertures in said neck side walls said handle has a metal security ring at the end furthest from said load receiving vessel.

20. Scoop of claim 18, wherein inclinometer means are mounted in said handle and operatively associated with said CPU, whereby angular deviation from the horizontal can be compensated so that said readout display means shows the correct weight, and said flexmount means comprises an elastomeric grommet of predetermined yield load mounted matingly in an aperture in said end wall, said grommet having opposed generally planar faces and having paired spaced apart peripheral flanges to engage said end wall around said aperture, said grommet also having paired horizontal vertically aligned apertures, and paired horizontally aligned bolts passing through said grommet apertures and engaging threaded apertures within said load cell means, the heads of said bolts touching one of said planar faces, and said overload protection means comprises a transverse check rod passing horizontally through said load cell means, the ends of said check rod being secured in opposed apertures in said neck side walls and said handle has a metal security ring at the end furthest from said load bearing vessel.

* * * * *